(12) United States Patent
Cunningham et al.

(10) Patent No.: US 6,313,566 B1
(45) Date of Patent: *Nov. 6, 2001

(54) PIEZOELECTRIC MOTOR

(76) Inventors: John Cunningham, 35 Loughberry Rd., Saratoga Springs, NY (US) 12866; Ephrahim Garcia, 2909 12th Ave. South, Nashville, TN (US) 37204; David V. Newton, 2 Sealand Dr., Newtown, CT (US) 06470

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,261

(22) Filed: Jul. 8, 1997

(51) Int. Cl.[7] ................................................... H01L 41/08
(52) U.S. Cl. ...................................... 310/328; 310/323.02
(58) Field of Search ............................ 310/51, 323, 326, 310/327, 328, 333, 345, 323.02

(56) References Cited

U.S. PATENT DOCUMENTS

| | | | |
|---|---|---|---|
| 3,649,856 | * | 3/1972 | O'Neill ................................ 310/328 |
| 4,339,682 | * | 7/1982 | Toda et al. ........................ 310/328 X |
| 4,454,441 | * | 6/1984 | Taniguchi ............................. 310/328 |
| 4,785,177 | * | 11/1988 | Besocke ........................... 310/328 X |
| 5,136,200 | * | 8/1992 | Takizawa et al. ................... 310/323 |
| 5,396,142 | * | 3/1995 | Koblanski ............................ 310/328 |
| 5,821,666 | * | 10/1998 | Matsumoto et al. ............. 310/328 X |

FOREIGN PATENT DOCUMENTS

| | | | | |
|---|---|---|---|---|
| 0093477 | * | 6/1983 | (JP) | ..................................... 310/323 |
| 0156283 | * | 8/1985 | (JP) | ..................................... 310/323 |
| 0209483 | * | 8/1988 | (JP) | ..................................... 310/323 |
| 00257474 | * | 10/1988 | (JP) | ..................................... 310/323 |
| 0056077 | * | 3/1991 | (JP) | ..................................... 310/328 |
| 0853711 | * | 8/1981 | (SU) | ..................................... 310/323 |

* cited by examiner

*Primary Examiner*—Mark O. Budd
(74) *Attorney, Agent, or Firm*—Porter, Wright, Morris & Arthur

(57) ABSTRACT

A piezoelectric motor including a motor body, a compliant layer in communication with the motor body, and a predetermined number of legs in communication with the compliant layer, which urges the legs into engagement with a substrate. Each of the legs includes a piezoelectric wafer, preferably operated in the shear mode. The actuation of a piezoelectric wafer causes the corresponding leg to be displaced relative to a substrate. This displacement results in the transfer of strain energy to the compliant layer. The energy stored in the compliant layer may be released, causing the motor to advance along the substrate. The legs may be capable of moving independently from one another and also may be capable of moving sequentially or in a predetermined groups or units. The legs also may be arranged in pairs with the leg pairs being capable of simultaneous actuation. The motor is capable of maintaining a high holding force in the absence of a power input.

20 Claims, 4 Drawing Sheets

PIEZOELECTRIC MOTOR

BACKGROUND OF THE INVENTION

This application relates to piezoelectric motors, and more particularly, to a piezoelectric motor capable of storing energy which may be used to propel the motor.

In piezoelectric motors, an electro-active material is used to convert electric potential directly into mechanical strain. Piezoelectric motors rely on friction to convert micro strain to macro motion.

Piezoelectric motors are useful in precision actuators and effectors, such as robotic manipulators. They typically offer advantages over conventional motors (i.e., those that rely on electromagnetic coupling in air gaps) in precision control applications in which light weight, compact size, low energy use, or the ability to operate under cryogenic or other extreme environmental conditions is desired.

Conventional piezoelectric motors generally involve a series of mechanical steps. The motors do not store energy.

The components of conventional piezoelectric motors are small relative to the stepwise displacement. It may be difficult or expensive to manufacture such motors that are capable of maintaining acceptable tolerances using conventional equipment and methods. They also are susceptible to failure if wear exceeds these tolerances.

SUMMARY OF THE INVENTION

It is an object of the present invention to provide a piezoelectric motor capable of motion by successively inducing small amounts of strain in a substrate, and particularly a piezoelectric motor suitable for use in applications that require compact, large power-density, long stroke precision actuators.

It is another object of the present invention to provide a piezoelectric motor capable of storing energy from the motion of a leg, which energy may be released to cause the motor to move relative to a substrate, and that is capable of holding a constant force while consuming no power.

It is yet another object of the invention to provide a piezoelectric motor having a compliant surface that tends to urge the motor into engagement with the substrate, thereby avoiding the tolerance and wear problems encountered in the prior art.

It is a further object of the invention to provide a piezoelectric motor having a sufficient number of substrate-engaging legs to provide an acceptable level of redundancy to minimize single point failures.

The foregoing objectives are achieved in a piezoelectric motor including a motor body, a compliant layer in communication with the motor body, and a predetermined number of legs in communication with the compliant layer that urges the legs into engagement with a substrate. Each of the legs includes a piezoelectric wafer, which preferably is operated in the shear mode. The actuation of a piezoelectric wafer causes the corresponding leg to be displaced relative to a substrate. This displacement results in the transfer of strain energy to the compliant layer. The energy stored in the compliant layer may be released, causing the motor to advance along the substrate.

The legs may be capable of moving independently from one another; they also may be capable of moving sequentially or in a predetermined groups or units. In one preferred embodiment, the legs are arranged in pairs with the leg pairs being capable of simultaneous actuation. The piezoelectric wafers in the legs may be actuated by an analog voltage source arranged in parallel with the leg pairs.

In another preferred embodiment, the piezoelectric motor may include a motor body and a predetermined number of legs connected to the body through a compliant interface that urges the legs into engagement with a substrate. Each leg includes at least one electro-active element, which preferably is a piezoelectric wafer operated in the shear mode.

The piezoelectric motor of another preferred embodiment comprises a motor body, a compliant layer capable of storing strain energy in communication with the motor body and a predetermined number of legs in communication with the compliant layer, which maintains the legs in engagement with a substrate. Each leg includes a piezoelectric element. Actuation of a piezoelectric element causes displacement of the corresponding leg. The discharge of the piezoelectric element transfers strain energy to the compliant layer. The release of the energy stored in the compliant layer causes the motor to advance along a substrate. The motor is capable of maintaining a high holding force in the absence of a power input.

These and further objects of the invention will become apparent from the following detailed description.

DESCRIPTION OF THE PREFERRED EMBODIMENT(S)

The piezoelectric motor of the present invention has a legs, formed from one or more piezoelectric wafers, that engage a shaft or other substrate. The motor generates output force through the frictional contact of the legs and the substrate. The invention contemplates applications in which the motor body is fixed and the legs cause the substrate to move as well as applications in which the substrate is fixed and the legs cause the motor body to move along the substrate.

Figure 1:
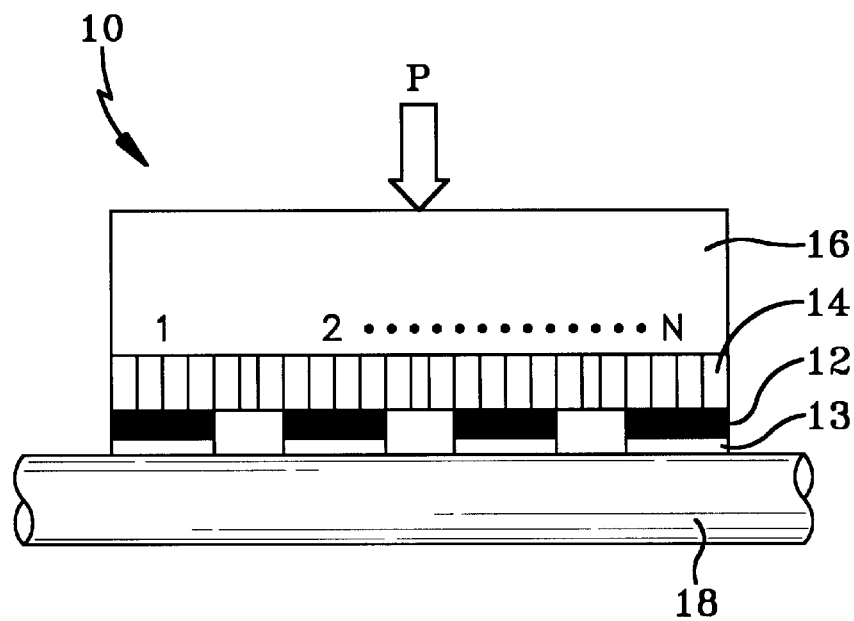
FIG. 1 is a schematic representation of a linear piezoelectric motor of the present invention.

Turning now to the drawings, FIG. 1 shows a schematic representation of a linear piezoelectric motor 10 of the present invention. The motor 10 has a predetermined number N of legs 12, each of which includes at least one piezoelectric element, preferably a piezo shear wafer. A compliant layer 14 on the motor body 16 maintains the legs 12 in engagement with a shaft or other substrate 18. A preload force P may be applied to the motor body 16 to assist in maintaining the legs 12 in engagement with the substrate 18. The frictional contact of the legs 12 and the substrate 18 resulting from actuation of the piezoelectric wafers causes the motor 10 to move relative to the substrate 18, as described further below. A contact layer 13 may be interposed between the leg 12 and the substrate 18 to further assist in maintaining this contact.

In the drawings, the size of the legs and the motion of the legs have been exaggerated to better show the structure and operation of the motor. The legs of a piezoelectric motor of the present invention are, in fact, very small, and the motion of the legs generally is not discernible without magnification. Finite steps are taken to yield macroscopic motion.

In the example shown, the legs 12 are arranged linearly at a distance from one another along an axis of the motor body 16. The N legs also may be arranged in pairs or even larger multiples, with the legs in each pair or other multiple unit spaced at a distance from one another. Unless otherwise specified, subsequent references to N legs also apply to N units comprising two or more coupled legs. The use of a large number N of legs provides redundancy that allows the motor to continue to work effectively even if some of the legs are damaged. This is particularly valuable when the motor is intended for use in applications where it is not readily accessible for repairs or where a single point failure would result in unacceptable downtime or even more serious consequences.

The legs 12 of the motor 10 may be capable of moving independently of one another. Alternatively, the control of the legs 12 in one or more multiple units may be coupled so that they move together in response to a control signal. The legs 12 may be capable of moving in a single axis, as shown in the linear motor 10 of FIG. 2, or they may be capable of moving along multiple axes, as shown in the rotary motor 10'' of FIG. 4.

FIG. 2 is a series of schematic representations showing a complete cycle of operation for a motor 10' having four legs 12'. A leg, such as leg 2 in FIG. 2(a), is actuated, causing it to be displaced along the substrate 18' a distance s. This leg 12' is able to be displaced because the applied voltage is sufficient to cause the leg to break into kinetic friction. The other legs, however, are held in place relative to the substrate 18' by static friction. Thus, when the motor 10' is in the state represented by FIG. 2(b), two net forces are acting on the motor body 16' through the compliant backing 14', namely, the force of leg 2 pulling the motor forward and the sum of the forces of the remaining legs holding the motor back. The static equilibrium of these forces cases the motor 10' to move forward by the substep d. When the leg 2 is discharged, the strain of its piezoelectric wafer is transferred to the compliant material 14' and all of the legs 12' then are held in place relative to the substrate 18' through static friction. Thus, the motor 10' of the present invention is capable of holding a constant force without a voltage input.

The actuation and discharge steps above may be repeated for each of the N legs, as shown for legs 1, 3 and 4 in FIGS. 2(c) through 2(h), until the motor 10' has taken a full step, s. During this process, the number of legs 12' holding the motor 10' back incrementally decreases while the number of legs 12' pulling the motor 10' forward increases. The entire cycle may be repeated until a desired displacement s has been achieved.

In the example shown, one leg 12' is actuated at a time. However, the legs also may be actuated in pairs or higher multiples to increase the speed at which the motor moves (not shown in the drawings). The control signals used to drive the motor 10' need not be synchronized because the compliant interface 14' will indiscriminately store the strain energy.

Figure 3:
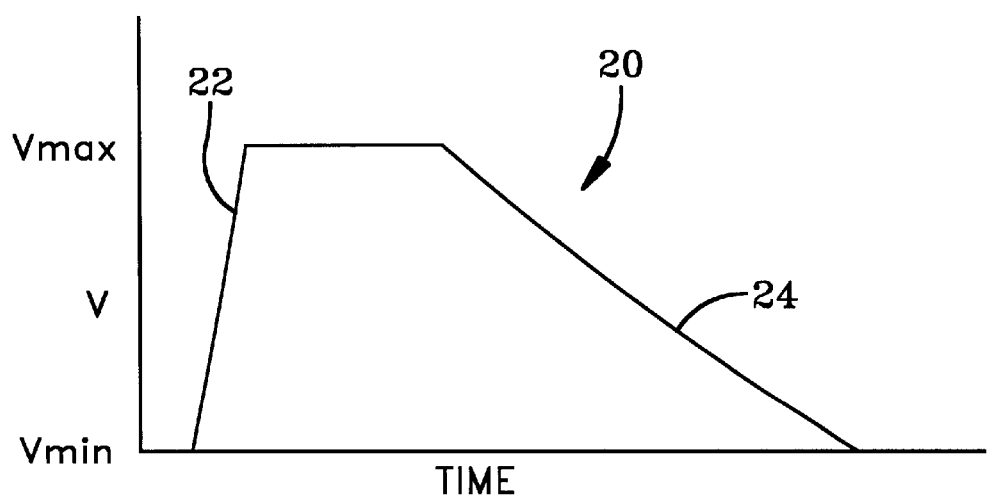
FIG. 3 is a schematic diagram of a waveform that may be used to actuate a leg of the piezoelectric motor of FIG. 2.
Figure 2A:
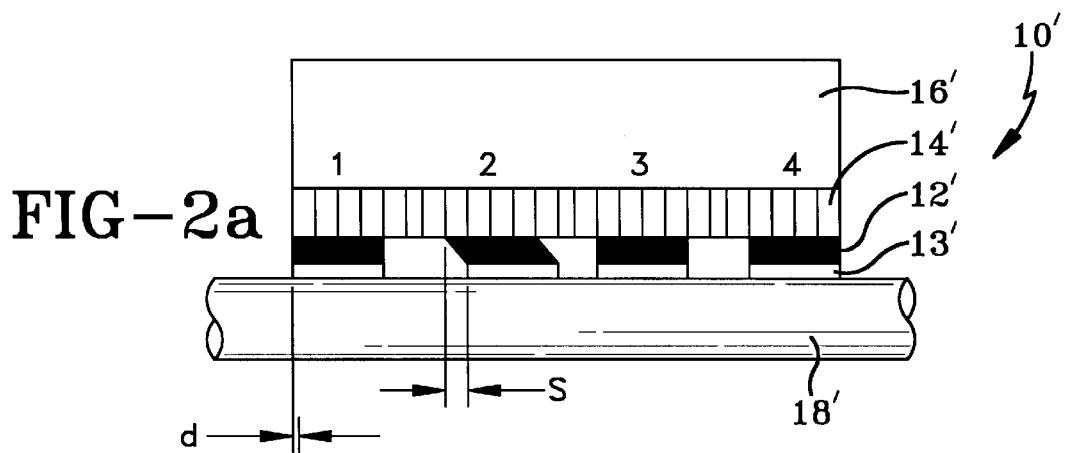
FIG. 2 is a series of schematic representations, designated (a) through (h), showing the stepwise operation of the piezoelectric motor of FIG. 1 through a complete cycle.
Figure 2B:
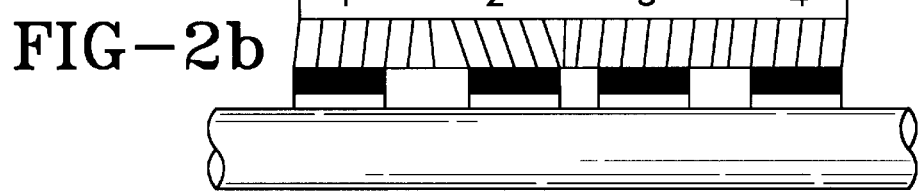
Figure 2C:
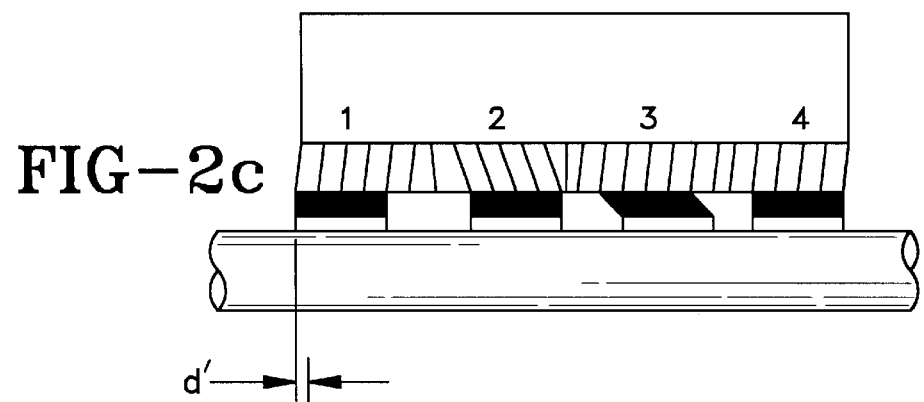
Figure 2D:
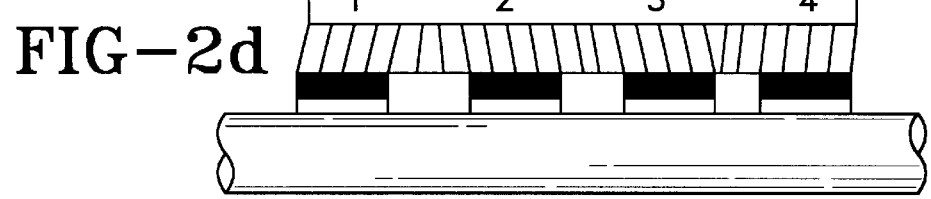
Figure 2E:
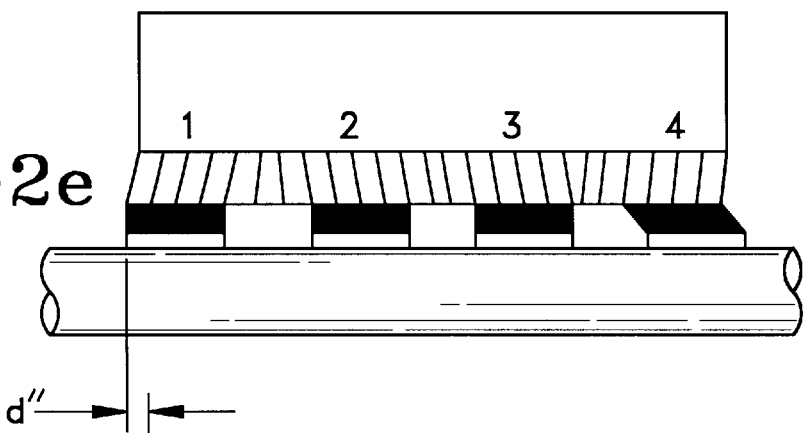
Figure 2F:
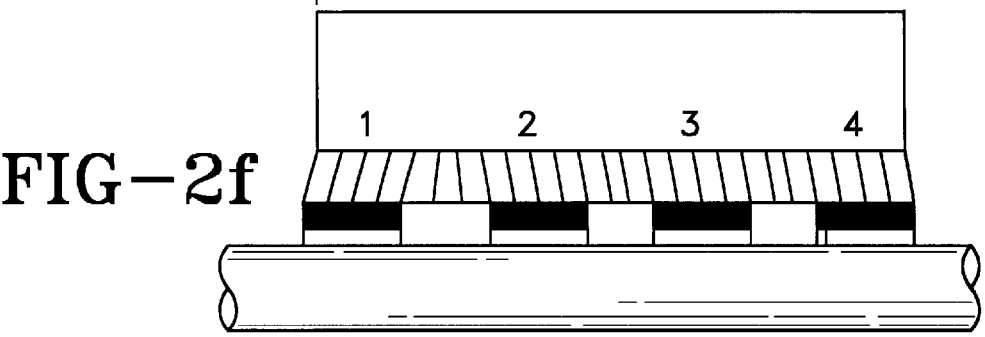
Figure 2G:
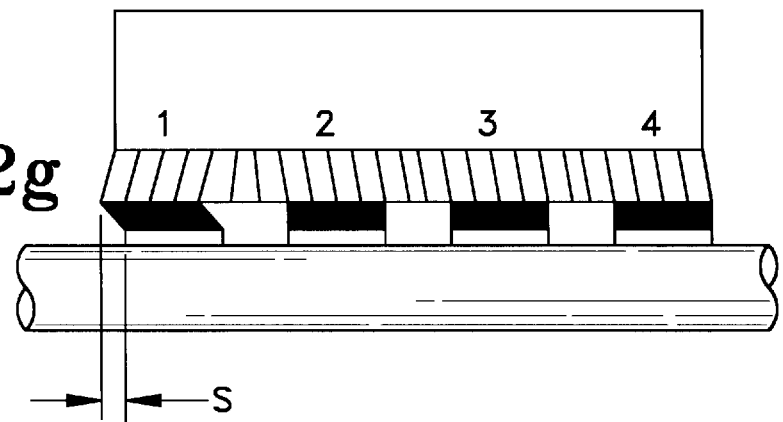
Figure 2H:
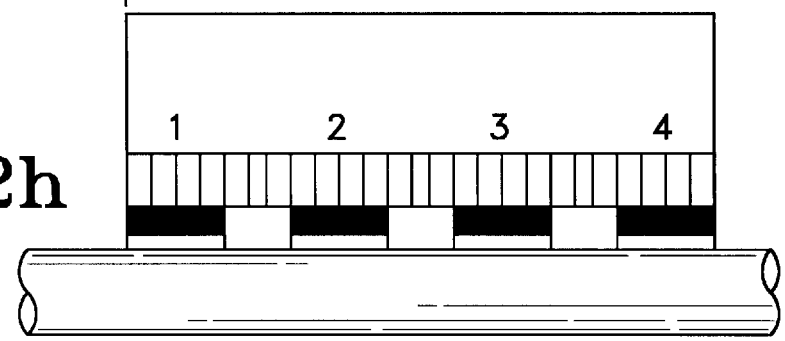

FIG. 3 is a schematic diagram showing a waveform 20 that may be used to cause a leg 12' of the motor of FIG. 2 to advance a single step. Each leg 12' is actuated individually by a voltage pulse, which switches the voltage from $V_{min}$ to $V_{max}$. The pulse results in a high slew rate (slope) 22 sufficient to cause a jerk-slip response in a leg, such as leg 2 of FIG. 2(a). Once the leg 12' is in its advanced state, the voltage is discharged through a resistor to form the low-sloped portion 24 of the sawtooth waveform and the leg 12' is held in place through static friction.

The velocity of the motor may be controlled by adjusting the frequency of the signals, the peak voltage (step size), or both. Speed reductions down to zero may be achieved by controlling the frequency or voltage of the signal applied to the piezo elements. Finite steps may be taken at any desired frequency as required by the application.

The control signal shown in FIG. 3 may be generated, for example, using a combination of digital and analog circuitry. Timed waveforms may be generated using a control unit such as an MCU with a digital to analog (D/A) converter. The output of the MCU is N low power signals used to control a series of high voltage amplifiers. The jerk phase of the control sequence may be amplified using a power metal oxide semiconductor field effects transistor (MOSFET) voltage switch. The drive phase of the control sequence may be accomplished by discharging all of the leg actuators through an RL circuit. Alternatively, the waveform shape during the drive phase may be controlled using two power transistors with different current limits. The high slope phase can be charged through a high current limit and the low slope phase can be charged through a low current limit. Of course, a person of ordinary skill in the art may devise other control signals for controlling the motor legs.

The static displacement capability s of the legs determines the range of micropositioning. The size of the displacement s is determined by the $d_5$ constant of the piezoelectric material (for operation in the shear mode) and the applied voltage. Extremely fine micropostioning may be achieved by arranging the legs in pairs and operating all of the leg pairs together in parallel with an analog voltage or charge amplifier.

The direction of travel may be controlled by reversing the polarity of $V_{max}$. Alternatively, the input signal can be changed from the up-slow sawtooth form of FIG. 3 to a down slow-sawtooth form.

The peak voltage $V_{max}$ applied to each leg may be equal, but this is not required because the compliant layer stores energy indiscriminately. It may be necessary, however, to vary the voltage applied to one or more legs to achieve motion of a distance s, particularly when the legs are actuated sequentially. For example, if the compliant layer is particularly efficient in storing the strain energy, it may be necessary to decrease the peak voltage applied to one or more legs actuated toward the end of the cycle to avoid overshooting the distance s.

It is believed that the step size s is approximated by $$d_{15}*V_{max}*N$$

where $d_{15}$ is the piezoelectric displacement constant, $V_{max}$ is the applied voltage, and N is the number of shear wafers in each leg. For one wafer layer and d15 value of 800e-12m/V and $V_{max}$ of 400V, the unit displacement is estimated to be 0.32 microns. If five shear wafers were used in each step, the unit displacement is estimated to be 1.6 microns. Because the piezoelectric is not moving an inertial mass, the resonance of the wafer will be high (at least as high as 50 kHz). If the motor is operated at 25 kHz, a frequency well within the capability of power MOSFET, the motor velocity is estimated to be 40 mm/sec. The velocity may be increased by increasing the number of shear wafers per leg. In addition, the velocity of the motor may be controlled by adjusting the frequency of the signals or the peak voltage, as described above.

It also is believed that the force output of the motor can be estimated by assuming that the force generated will be the lesser of the piezoelectric force and the friction force. For a shear plate 10 mm wide×0.25 mm thick, the piezoelectric blocked force is approximately 110 N. The friction force is determined by the preload applied to the motor body. It is assumed that the static coefficient of friction will dominate the contact interaction. As an example, the static coefficient of friction for steel on ceramic generally is within the range of 0.1 to 0.5. If an SMA band is used as a preload mechanism, a 250 N preload is achievable. In this example, the lower limit of the projected force output of the motor would be 25 N and the upper limit would be the piezoelectric blocked force, which is about 110 N.

Figure 4:
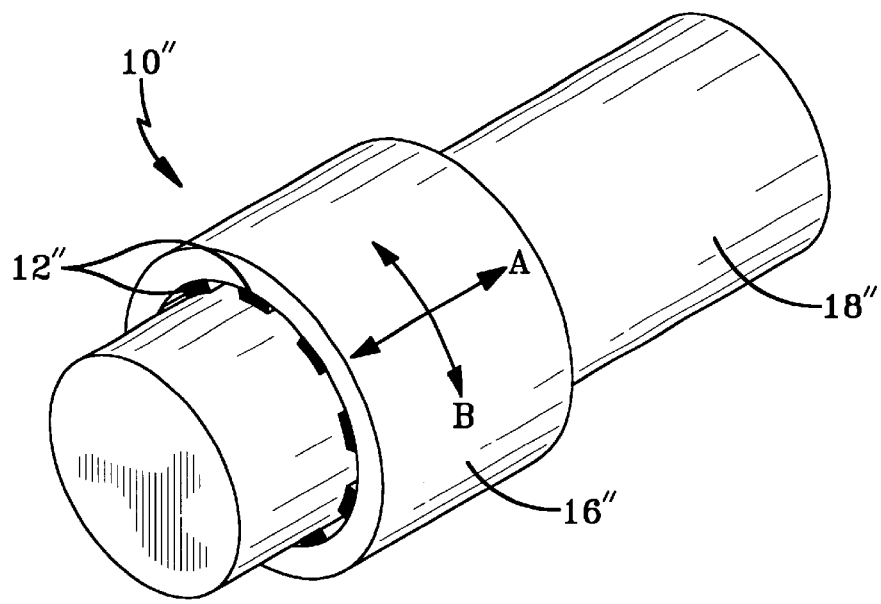
FIG. 4 is a schematic representation of a linear and rotary piezoelectric motor of the present invention.

As shown in FIG. 4, the piezoelectric motor 10'' of the present invention also may be configured to achieve rotary motion, either alone or in combination with linear motion. The motor 10'' comprises a predetermined number N of piezoelectric legs 12'' attached to a motor body 16'' through a compliant layer (not shown in the drawing). The motor 10'' generates output force through the frictional contact of the motor 10'' with a shaft 18''. The motor body 16'' may move linearly (in direction A) or rotatably (in direction B), or both, relative to the shaft 18''.

The compliant layer ensures that the legs are always in contact with the substrate. It also stores strain energy to allow the legs to move without complex synchronization. The compliant material must be stiff enough to maintain the legs in communication with the substrate; it also must be resilient enough to store energy imparted to it from the release of strain in the legs and not interfere unduly with actuation of the legs. Materials having a wide range of properties may be suitable for one or more applications of the present invention, depending, among other things, upon the environment in which the motor will be used and the forces that may be expected to act upon the compliant layer during use or transportation of the motor. Examples of materials that may be useful in forming the compliant layer include moderately stiff elastomeric materials, plastics and polyurethanes. The compliant layer may be formed independently from and adhered to the motor body. Depending on the material selected for the compliant layer, it also may be possible to form the compliant layer by coating or otherwise applying it to the motor body.

The legs may be secured to the compliant layer by any method that holds the legs in contact with the compliant layer and allows the legs to impart strain energy into the compliant layer. For example, the legs may be secured to the compliant layer using an adhesive material. Other methods of securing the legs to the compliant layer, such as inserting the legs directly into an uncured or partially cured compliant layer, also may be used. A contact surface may be interposed between the bottom of the piezoelectric wafer in a leg and the substrate. The contact surface may be formed from any suitable material having suitable wear and frictional properties (high static friction and low kinetic friction to aid the motion of the leg relative to the substrate).

Each active leg includes at least one piezoelectric wafer, although additional wafers may be stacked together in a single leg to obtain an increase in the force or displacement. Piezoelectric materials typically have a low tensile strength, so wafer(s) must be secured within the legs in a way that reduces the possibility of tensile failure in the piezo wafers.

Figure 5:
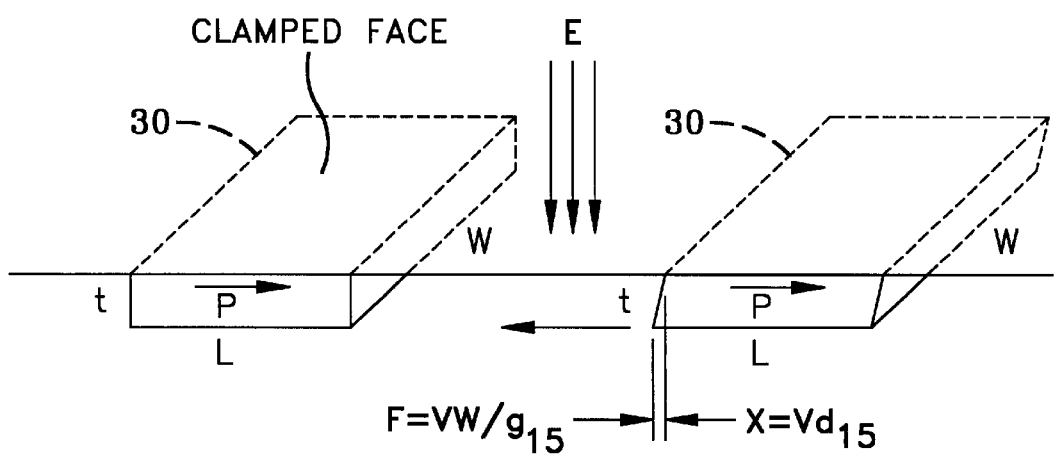
FIG. 5 is a schematic representation of a piezoelectric wafer showing operation of the wafer in the shear mode.

Preferably, the wafers are operated in the shear mode to maximize displacement output per volt input. FIG. 5 depicts operation of a piezoelectric wafer 30 in the shear mode. As explained above, a high piezoelectric d constant corresponds to a large displacement output per volt input. The highest piezoelectric d constant is $d_{15}(d_{15},d_{33}>d_{31})$, so actuation of the piezoelectric material in the "15" direction, referred to as the shear mode, will maximize the displacement output per volt input. In the shear actuation mode, the polarization direction P is perpendicular to the applied field E, which allows the piezoelectric wafer to be operated at a high bipolar operating voltage (i.e., the motor can be operated at both large positive and negative actuation voltages without the risk of depolarization). The maximum field is limited only by the dielectric breakdown voltage. (In "3x" applications, the negative field is limited in the negative direction by depolarization and in the positive direction by dielectric breakdown.) In addition, operation of the piezoelectric material in the shear mode allows the legs to be preloaded to the shaft while still being able to deform, and reduces non-linearity, creep and aging.

Both the efficiency of the energy conversion in the motor of the present invention and the response time depend on the properties of the active material selected. Suitable piezoelectric materials may include lead zirconium titanate (PZT), magnetorestrictive materials (e.g., Terfinol-D), and electrorestrictive materials (e.g., lead magnesium niobate (PMN)) having an appropriate loss factor and response time. Piezoelectrics typically are characterized by a fast response time so the response time of the motor of the present invention may be less than 1 msec.

The motor of the present invention offers advantages over both conventional electromagnetic motors and other piezoelectric motors. It provides larger force and speed output in a simple and reliable package.

Although a specific embodiment of the invention has been described herein in detail, it is understood that variations may be made thereto by those skilled in the art without departing from the spirit of the invention or the scope of the appended claims.

We claim:

1. A piezoelectric motor capable of displacement relative to a substrate, comprising:

a motor body;

a predetermined number of substrate-engaging legs each comprising a piezoelectric wafer;

a compliant layer between the motor body and the legs; and a bias element exerting a force upon the motor body to cause the legs to engage the substrate, the actuation of a preselected piezoelectric wafer overcoming the bias force to displace the corresponding leg relative to the substrate and the discharge of the piezoelectric wafer transferring strain to the compliant layer, the strained compliant layer exerting a force against the leg that cooperates with the bias element to urge the leg into engagement with the substrate when the piezoelectric wafer is not actuated.

2. The piezoelectric motor according to claim 1, wherein the legs are capable of moving independently of one another.

3. The piezoelectric motor according to claim 2, wherein the legs are capable of moving sequentially.

4. The piezoelectric motor according to claim 1, wherein the leg displacement causes energy to be stored within the compliant layer.

5. The piezoelectric motor according to claim 1, wherein the release of energy stored within the compliant layer causes the motor to advance along a substrate.

6. The piezoelectric motor according to claim 1, wherein the compliant layer cooperates with the legs to move the motor relative to a substrate.

7. The piezoelectric motor according to claim 1, wherein a piezoelectric wafer is operated in the shear mode.

8. The piezoelectric motor according to claim 1, wherein the legs are arranged in pairs, the legs in a pair being capable of simultaneous actuation.

9. The piezoelectric motor according to claim 8, further comprising:
   an analog voltage source arranged in parallel with the leg pairs, said voltage source being capable of actuating the piezoelectric wafers in the legs.

10. A piezoelectric motor capable of displacement relative to a substrate, comprising:
   a motor body;
   a predetermined number of substrate-engaging legs connected to the motor body through a compliant interface, each of the legs comprising an electro-active element; and
   a bias element exerting a force upon the motor body to cause the legs to engage the substrate, the actuation of the electro-active element of a preselected leg overcoming the bias force to displace the corresponding leg relative to the substrate and the discharge of the electro-active element transferring strain to the compliant layer, the strained compliant layer exerting a force against the leg that cooperates with the bias element to urge the leg into engagement with the substrate when the electro-active element is not actuated.

11. The piezoelectric motor according to claim 9, wherein the electro-active element is a piezoelectric wafer.

12. The piezoelectric motor according to claim 11, wherein the piezoelectric wafer is operated in the shear mode.

13. A piezoelectric motor capable of displacement relative to a substrate, comprising:
   a motor body;
   a compliant layer capable of storing strain energy connected to the motor body;
   a predetermined number of substrate-engaging legs connected to the compliant layer, each of the legs comprising at least one piezoelectric element; and
   a bias element exerting a force upon the motor body to cause the legs to engage the substrate, the actuation of a preselected piezoelectric element overcoming the bias force to displace the corresponding leg relative to the substrate and the discharge of the piezoelectric element transferring strain to the compliant layer, the strained compliant layer exerting a force against the leg that cooperates with the bias element to urge the leg into engagement with the substrate when the piezoelectric element is not actuated.

14. The piezoelectric motor according to claim 13, wherein the release of energy stored within the compliant layer causes the motor to advance along a substrate.

15. The piezoelectric motor according to claim 13, wherein the motor is capable of maintaining a high holding force in the absence of a power input.

16. The piezoelectric motor according to claim 1, wherein the compliant layer is selected from elastomeric materials, plastics and polyurethanes.

17. The piezoelectric motor according to claim 1, further comprising:
   a contact surface applied to the preselected leg that assists in maintaining the leg in engagement with the substrate.

18. The piezoelectric motor according to claim 1, wherein the bias element comprises a collar enclosing the substrate, the legs and compliant layer being arranged on the interior of the collar with the legs in engagement with the substrate.

19. The piezoelectric motor according to claim 10, wherein the bias element comprises a collar enclosing the substrate, the legs and compliant layer being arranged on the interior of the collar with the legs in engagement with the substrate.

20. The piezoelectric motor according to claim 13, wherein the bias element comprises a collar enclosing the substrate, the legs and compliant layer being arranged on the interior of the collar with the legs in engagement with the substrate.

* * * * *